United States Patent
Wagner et al.

[15] 3,682,126
[45] Aug. 8, 1972

[54] AMPHIBIOUS BRIDGE VEHICLE

[72] Inventors: Gerhard Wagner, Mainz-Lerchenberg; Friedrich Kroll, Mainz; Horst Gleich, Heilbronn-Bockingen; Georg Kessler, Oberwesel, all of Germany

[73] Assignee: Klochner Humboldt-Deutz Aktiengesellschaft, Koln-Deutz, Germany

[22] Filed: May 26, 1970

[21] Appl. No.: 40,490

[52] U.S. Cl. ................................................115/1 B
[51] Int. Cl. ................................................B60f 3/00
[58] Field of Search................................115/1 B, 1 R

[56] References Cited

UNITED STATES PATENTS

| | | | |
|---|---|---|---|
| 3,152,569 | 10/1964 | Gehlen et al | 115/1 X |
| 3,202,124 | 8/1965 | Calafat Mas | 115/1 R |
| 3,269,349 | 8/1966 | Gehlen | 115/1 B |
| 3,450,089 | 6/1969 | Lippincott | 115/1 R |

FOREIGN PATENTS OR APPLICATIONS

1,098,389   1/1961   Germany......................115/1

*Primary Examiner*—Andrew H. Farrell
*Attorney*—Walter Becker

[57] ABSTRACT

A vehicle having wheels for movement of the vehicle over the ground and having a longitudinal box-like frame with box-like bodies movably connected to the frame for movement thereon from a folded together position wherein the bodies are supported on the frame for transport to a folded out position wherein the bodies are arranged at opposite sides of the frame and form therewith an upwardly facing platform. The frame and bodies are buoyant and can thereby be utilized for forming bridges.

15 Claims, 14 Drawing Figures

AMPHIBIOUS BRIDGE VEHICLE

The present invention relates to an amphibious bridge vehicle with floating bodies which are located above the vehicle body when the vehicle drives over land and which are adapted to be folded toward the outside on both sides when the vehicle is used as amphibious vehicle.

Vehicles of this type which are primarily intended for military use form self-propelled units which individually or coupled to each other form a ferry or when coupled in series, are employed as floating bridge. Therefore, in connection with vehicles of this type it is necessary that the floating bodies are adapted selectively to be folded out once or twice in order on one hand to adapt the bridge to the respective load and on the other hand to adapt the bridge to the total distance between the banks. Finally, the foldable floating bodies must at the ends of the bridge be convertible into ramps for driving onto and off the bridge.

It is an object of the present invention to provide an amphibious vehicle of the above mentioned type in which the conversion from a vehicle for driving over land to an amphibious vehicle and vice versa can be carried out in a minimum of time and by a minimum of persons. This object can practically be realized only when the operations to be carried out in connection with the said conversion are mechanized as far as possible.

This object and other objects and advantages of the invention will appear more clearly from the following specification in connection with the accompanying drawings, in which.

The amphibious bridge vehicle according to the present invention is characterized primarily in that floating bodies of rectangular cross-section have their narrow sides arranged adjacent to each other above the vehicle body when the vehicle is used as a land vehicle and by linkage means are so guided that the wide sides facing each other will, after unfolding the floating bodies by 90°, form a continuous platform. The unfolding by 90°, instead by 180° as heretofore customary, not only results in cutting down the time for this operation but, above all, furnishes the possibility to transport floating bodies of relatively great width when the vehicle is being used as a land vehicle, in a vertical standing position. The unfolding by 90° is made possible by the linkage system, as will be explained further below.

In order to be able to form a platform of a larger surface, additional outer floating bodies are in an unfoldable manner linked to the inner floating bodies which are located above the vehicle body. In conformity with the present invention, the additional outer floating bodies extend from their linkage point with the upper edge of the adjacent wide sides on both sides of the vehicle body to below the platform surface thereof and preferably to its lower edge. These outer floating bodies will thus have a still greater width than the inner floating bodies.

When vehicles of the above mentioned type are intended as ferries or are adapted to carry considerable loads as a bridge, the inner and outer floating bodies are from their position during driving over land folded outwardly by 90° so that the outer floating bodies will be located below the inner floating bodies and partially below the vehicle body. In this way, a maximum of buoyancy is obtained with a correspondingly limited total width of the platform surface for a narrow coupling of the vehicles.

For a wide coupling of the vehicles, during the unfolding of the inner floating bodies by 90°, the outer floating bodies are adapted in opposite direction of rotation to be folded outwardly by 180° so that the inner and outer floating bodies in their end position will with the narrow sides of their rectangular cross-section engage each other and with their upper wide sides will form a continuous platform surface.

Finally, the outer floating bodies are once more subdivided in such a way that a part ending in an acute angle and foldable outwardly about joint pivots will form the end member of a ramp. The ramp members in their turn are preferably subdivided as to width, for instance, into four individual members each of which is pivotally connected to the outer floating body. This subdivision serves for equalizing a possible unevenness of the bank.

For folding the inner floating bodies outwardly and inwardly, preferably hydraulic cylinder piston systems are provided which in folded out condition are pivotally connected to the vehicle between the vehicle body and the inner floating bodies near the lower edge thereof. These cylinder piston systems are also employed for adjusting the ramps at an angle corresponding to the level of the bank and are then hydraulically locked so that a change of the trim by wandering loads will be prevented.

According to a further development of the invention, the entire driving mechanism for land and water operation is provided in power heads located in front of or behind the vehicle body or the driving mechanism is provided in a power head located in front which simultaneously contains the driver's cab. A driving motor in the front power head normally drives the front wheels of the vehicle and selectively may drive the propellers journalled in the same power head and intended for use of the vehicle as amphibious vehicle. For cross-country driving, a driving connection may be provided which is adapted selectively to be coupled to the rear wheels. Inasmuch as the propeller drive, to be able to overcome greater counter currents, requires a higher driving power than is required for ordinary driving over land, a second driving motor may be placed in the rear power head for driving propellers located in said rear power head, independently of the propeller drive of the front power head.

The driving motor in the front power head which, under certain circumstances, may be the only driving motor, preferably drives all auxiliary devices, such as pumps of a hydraulic installation for the folding-out and folding-in of the floating bodies, for retracting and lowering the vehicle wheels, for a hydraulic steering mechanism, etc.

The combination of the entire driving mechanism in one or two driving heads makes possible a particularly favorable cross-sectional dimensioning of the foldable floating bodies and of the vehicle because the vehicle body, which simultaneously forms the floating body, will in this way have a relatively small height which corresponds to the height of the floating bodies. In this way, when considering the width of the individual floating bodies, a substantially even buoyancy of all elements is obtained. On the other hand, in view of the small height of the vehicle body in folded-in position of the additional floating bodies, a complete exploitation of the width of the vehicle and of the height of the vehicle is made possible. Finally, as a result thereof, with a single unfolding of the floating bodies by a total of 90°, the outer floating bodies extend below the vehicle body up to the vertical longitudinal central plane of the vehicle and thus will have a maximum width which, after a double unfolding, will give the surface area of the platform a maximum length.

In connection with the folding-out and folding-in of the additional floating bodies and the combination of the drives in one or two power heads, it is finally suggested that the front and preferably also the rear power head is pivotally connected to the vehicle body for pivoting the vehicle about vertical axes. Such so-called articulated steering will particularly contribute to the simplification of the drive inasmuch as it can be used for driving over land as well as when driving in water. Consequently, neither the vehicle wheels nor the propellers have to be pivotable with regard to the power heads. The said articulated steering is preferably effected by means of hydraulic cylinder piston systems. When driving over land, both driving heads are turned relative to the vehicle body by the same angle so that the front and rear wheels will run on the same turning circle. For amphibious operation, it is necessary to shift over the steering mechanism in such a way that both driving heads are independently of each other pivotable by means of a correspondingly arranged operating lever. With such an arrangement, a high moveability in the water will be obtained which makes possible all movements from a lateral transversing operation up to the turning about its axis.

Referring now to the drawings in detail, the relatively narrow and low vehicle body 1 is designed as a torsion resistant hollow body forming so to speak the spine of the vehicle. The front and rear of the vehicle are each equipped with a power head or driving unit head 3, 3' by means of a vertical hinge pin 2 for the articulated steering. The front driving unit head 3 comprises a driving motor with a complete driving mechanism for driving the front wheels 4 and the counter running propellers 5 which operate as pulling propellers. The drive is effected preferably through an infinitely variable hydrostatic transmission. For cross-country driving, there is additionally provided a shaft which is journalled in the vehicle body and extends toward the rear driving unit head 3' for selectively adding the drive for the rear wheels 4'. The rear driving unit head 3' comprises a second driving motor which operates the rear pressure propellers 5' only independently of the front motor and which is at a standstill during driving over land. The front motor drives all auxiliary devices and among these the devices for steering the vehicle and for folding-in and folding-out the floating bodies so that all operations can be controlled and effected from the driver's cab forming a part of the driving unit head 3.

Figure 1:
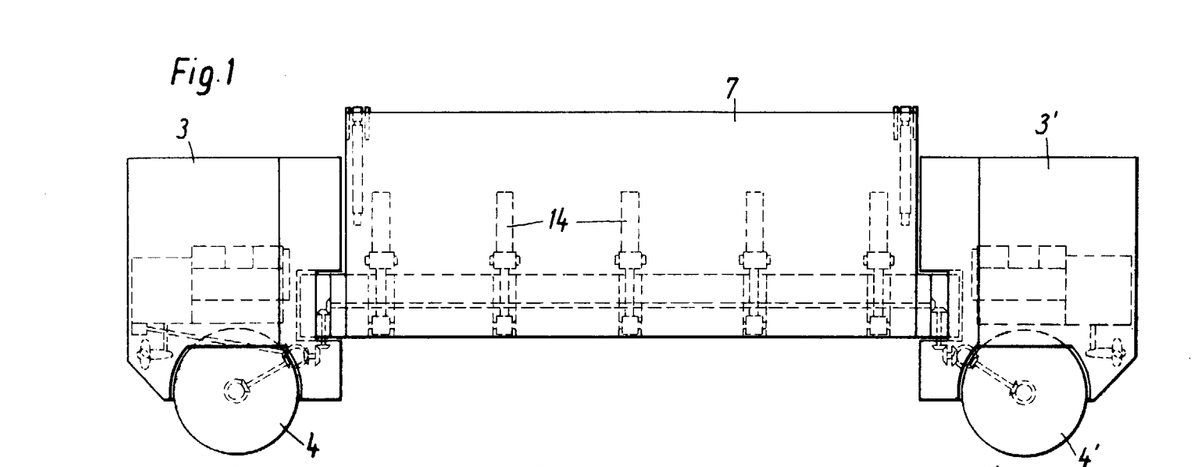
FIGS. 1 and 2 respectively illustrate in side view and top view a vehicle according to the invention with inwardly folded floating bodies for driving over land.
Figure 2:
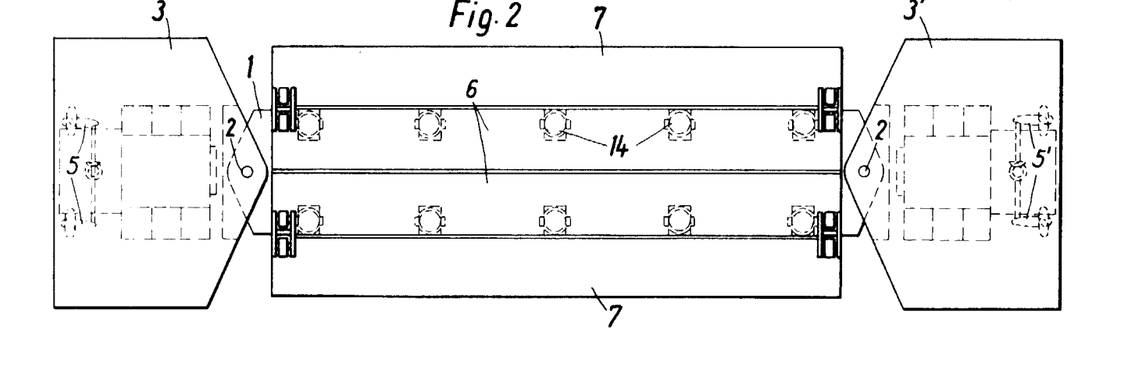
Figure 3:
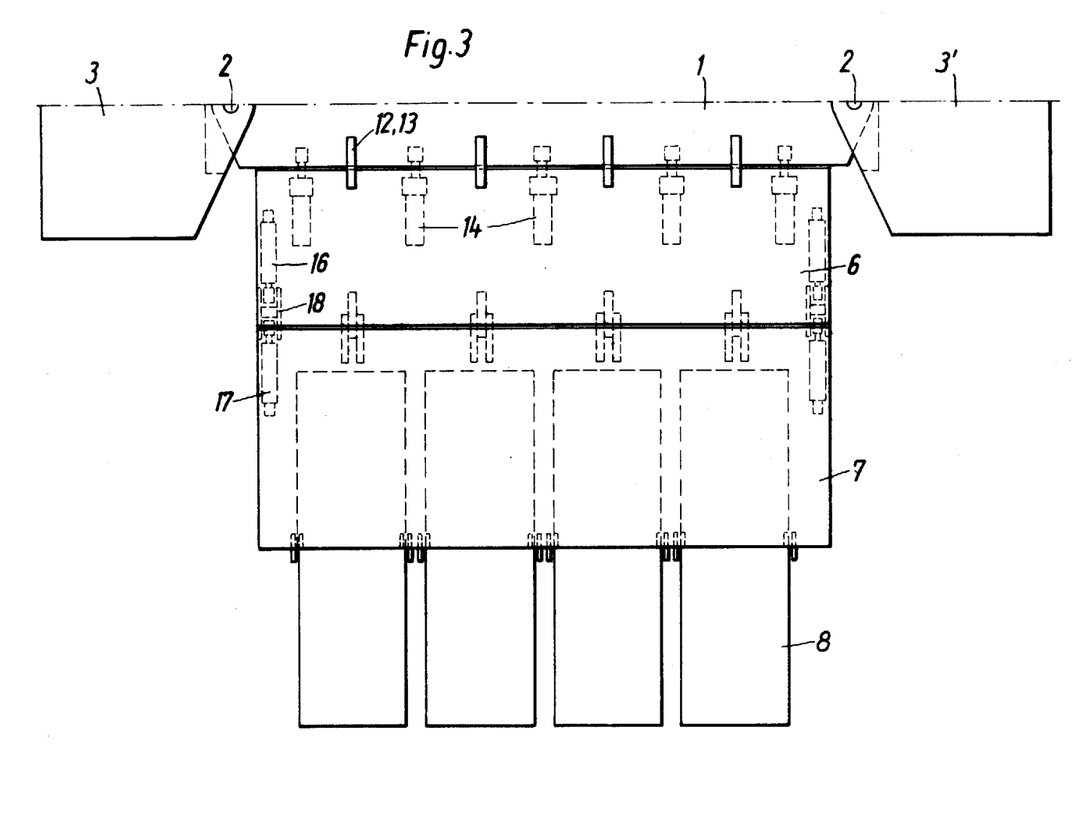
FIG. 3 is a corresponding top view of one side of the vehicle with the floating bodies and ramp members in folded out condition.

According to FIGS. 1 and 2, the inner floating bodies 6 and the outer floating bodies 7 which are arranged at both sides symmetrically with regard to the vertical longitudinal central plane are so arranged that their wide sides are vertical whereas, according to FIG. 3, they are folded laterally into the horizontal plane. Four individually foldable ramp members 8 which are intended to establish a connection with the bank form each a part of the driving track extending at a right angle to the longitudinal axis of the bridge vehicle.

Figure 4:
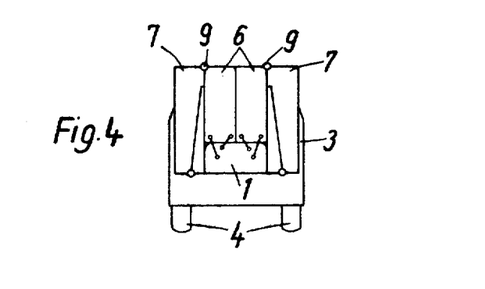
FIGS. 4 to 7 respectively illustrate a vehicle according to the invention in cross-section on a smaller scale than that of FIGS. 1 to 3 with the additional foldable floating bodies in four different positions.

FIG. 4 diagrammatically illustrates in a vertical section the position of the additional floating bodies 6, 7 for driving over land. The inner floating bodies 6 have their wide sides of the relatively flat rectangular cross-section located in the vertical longitudinal central plane adjacent to each other and with their narrow sides together make up the full width of the vehicle body 1. The outer floating bodies 7 which by means of joints 9 are suspended on the inner floating bodies have their wide side extend to the lower edge of the vehicle body so that all floating bodies together fill in a rectangular nearly square cross-section with practically no gaps therebetween.

Figure 5:
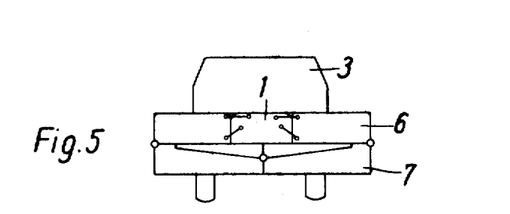

According to FIG. 5, the inner and outer floating bodies 6, 7 are together at both sides folded outwardly by 90°. In the illustrated end position, the outer floating bodies 7 are located below the inner floating bodies 6 and below the vehicle body 1 so that a great buoyancy is obtained for a close coupling of the vehicles.

Figure 6:
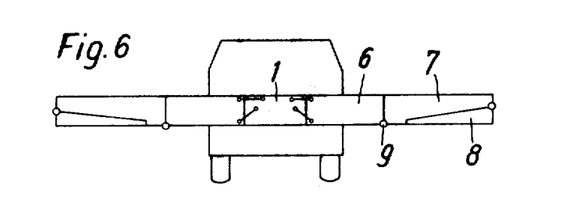

According to FIG. 6, the inner floating bodies 6 occupy the same position as shown in FIG. 5. However, the outer floating bodies 7 are folded about the links 9 by an angle of 180°. In this position, for a wide coupling of a plurality of vehicles to make up a ferry or bridge, the track formed by the individual vehicle is twice as long as in the position occupied by the floating bodies according to FIG. 5, and the load carrying ability is correspondingly lower.

Figure 7:
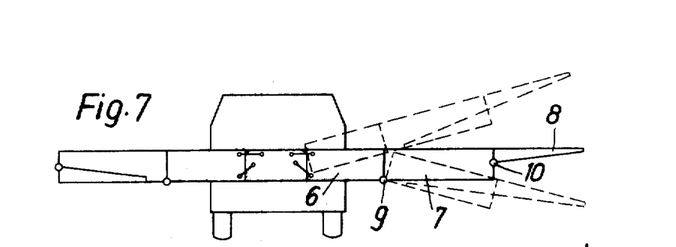

In the right-hand portion of FIG. 7, the end members 8 which end in a part forming an acute angle and which have previously been located in cavities on the bottom side of the outer floating bodies 7 are folded about links 10 and together with the floating bodies 6, 7 form a ramp for connection with the bank. By dash lines is indicated that the ramp is as a whole adjustable in upward direction in conformity with the height of the bank. An angular adjustment from the horizontal plane in downward direction is effected by turning about the pivot 9. Only the outer floating bodies 7 and the end members 8 take part in this pivoting movement.

Figure 8:
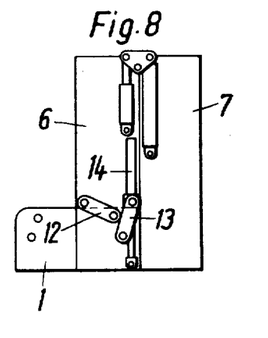
FIGS. 8, 9 and 10 respectively illustrate one side of the vehicle with linkage systems and working cylinders at a single unfolding for the narrow coupling in the position for driving over land, in an intermediate position, and in the position when the vehicle is used as amphibious vehicle.
Figures 9, 12:
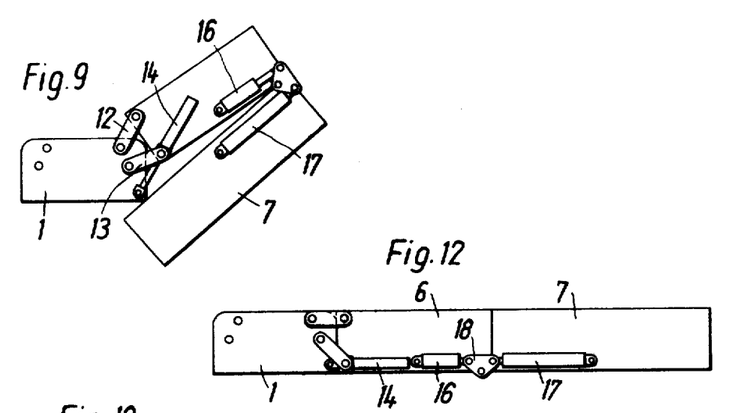
FIGS. 11 and 12 respectively illustrate one side of the vehicle with the floating bodies in an intermediate position and with the floating bodies in fully unfolded position for a wide coupling when using the vehicle as amphibious vehicle.
Figure 10:
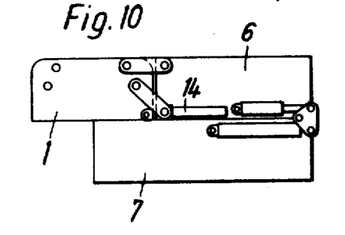

FIGS. 8, 9 and 10 illustrate for one side of the vehicle the common unfolding of the inner and outer floating bodies for a narrow coupling, and show these operations in three successive positions. The inner floating bodies 6 are connected to the vehicle body 1 by links 12, 13 arranged in pairs in such a way that the wide side of the inner floating bodies which point toward the center of the vehicle will, after being unfolded by 90°, form with the top side of the vehicle body a continuous platform surface. According to FIG. 3, four of such pairs of links 12, 13 are uniformly distributed over the length of the vehicle body. In unfolded position, the link portions of the links on the inner floating bodies 6 are arranged perpendicularly one above the other and are spaced by a considerably greater distance from each other than the links on the vehicle body 1. The folding operation is carried out by five hydraulic cylinder piston systems 14 which, in conformity with FIGS. 1–3, are arranged between the pairs of links and are likewise uniformly distributed over the length. FIG. 9 illustrates that the outer floating body 7 is slightly unfolded and occupies an intermediate position in order to circumvent the lower corner edge of the vehicle body 1. This is made possible by the additional hydraulic cylinder piston system 16, 17.

Figure 11:
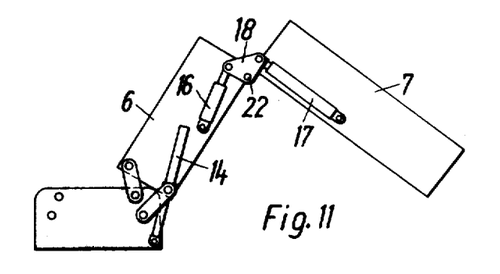

FIGS. 11 and 12 illustrated the unfolding of the floating bodies 6 and 7 for a wide coupling. While the working cylinder piston systems 14 unfold the inner floating body 6 by 90°, simultaneously the outer floating body 7 is folded outwardly by 180° by means of the cylinder piston systems 16, 17. These working cylinder piston systems are on one hand pivotally connected to the floating bodies and on the other hand to a triangular link 18 which has its third joint 22 mounted on the inner floating body 6. The cylinder piston systems 16, 17 are, in conformity with FIGS. 1–3, provided only on each end of the floating bodies.

Figure 13:
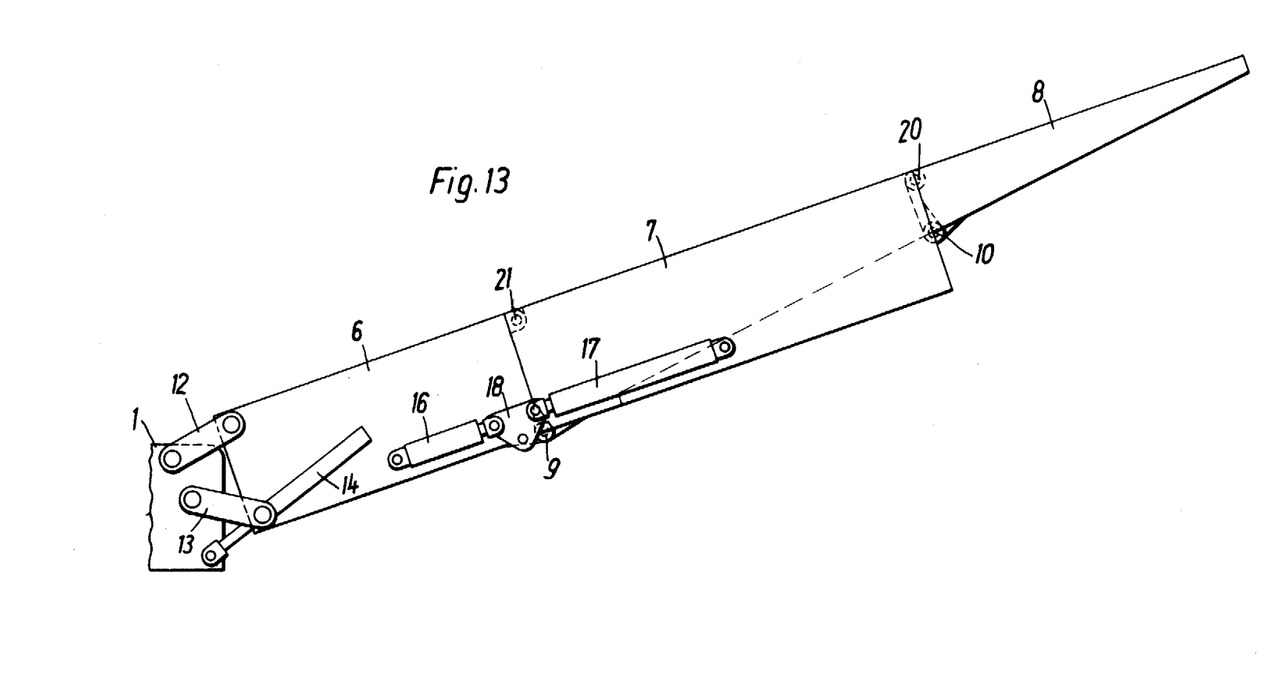
FIG. 13 shows the employment of the floating bodies as ramps on one side of the vehicle.

FIG. 13 shows the function of the floating body as ramp. As will be seen from FIG. 13, the end members 8 are following the unfolding about the pivots 10 reinforced with regard to the outer floating body 7 by introducing bolts 20 near the top side. In a similar manner the outer floating body 7 is after having been folded outwardly about the pivot 9, blocked relative to the floating body 6 by latching bolts 21 near the upper edge. A reinforcing or stiffening between the vehicle body 1 and the inner floating body is effected by hydraulically blocking the double acting cylinder piston systems 14 after they have placed the ramp onto the bank.

Figure 14:
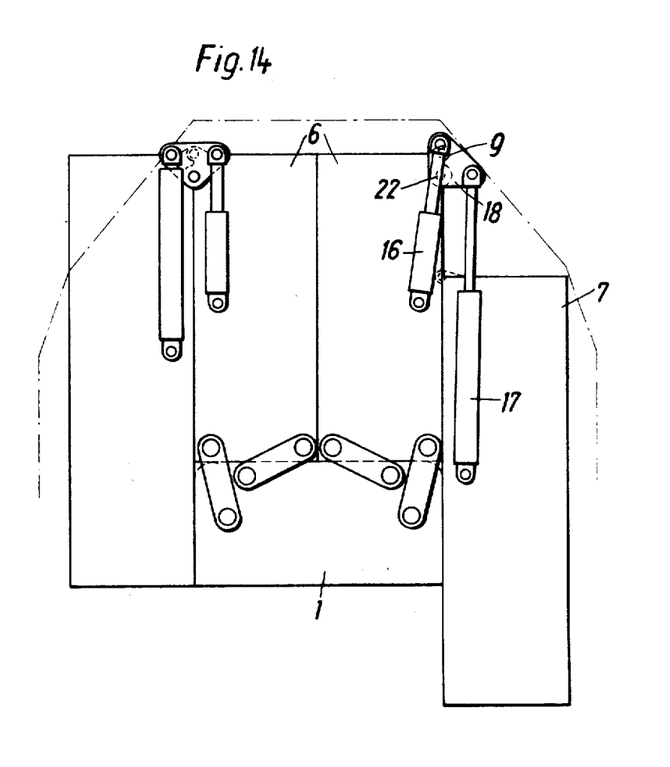
FIG. 14 illustrates how the outer floating bodies can be lowered, for instance, if the vehicle is to be transported by a train.

FIG. 14 illustrates how in case of taking full advantage of the admissible height and width of the standard rules concerning transit profiles, it can be avoided to move beyond the upper corners, for instance, when the vehicle is to be loaded onto a freight train. In such an instance, the links or pivots 9 between the floating bodies 6, 7 are removed and subsequently the outer floating bodies 7 are by means of the hydraulic cylinder piston systems 14 lowered to a considerable extent.

It is, of course, to be understood that the present invention is, by no means, limited to the particular showing in the drawings but also comprises any modifications within the scope of the appended claims.

What is claimed is:

1. An amphibious vehicle adapted for land travel and also for use in forming bridge-like structures; a vehicle frame, wheels on the frame at the ends thereof for support of the vehicle when on land, longitudinally extending buoyant bodies carried by said frame, and means movably connecting said bodies to said frame for movement of the said bodies oppositely pivotable between a folded together juxtaposed position longitudinally on top of said frame for land travel of the vehicle and folded out positions of lateral extension perpendicularly from the sides of said frame wherein said bodies and frame form a continuous upwardly facing platform, said frame comprising a longitudinally extending body portion generally rectangular in cross section, said bodies comprising a pair of first bodies generally rectangular in transverse cross section and disposed on top of said body portion with the larger sides thereof in vertical juxtaposed relation when in folded together position and disposed at respectively opposite sides of said body portion with the larger sides substantially horizontal when in folded out position, and with the upper surfaces of said bodies and body portion forming said continuous upwardly facing platform.

2. A vehicle according to claim 1, which includes a second body generally rectangular in cross section and movably connected to each of said pair of first bodies, each said second body being movable from a folded in position of juxtaposition with the respective first body to a folded out position of extension from the end of the said first body which is remote from said body portion when the said first body is in folded out position.

3. An amphibious vehicle adapted for land travel and also for use in forming bridge-like structures; a vehicle frame, wheels on the frame at the ends thereof for support of the vehicle when on land, longitudinally extending buoyant bodies carried by said frame, and means movably connecting said bodies to said frame for movement of the said bodies between a folded together juxtaposed position on top of said frame for land travel of the vehicle and folded out positions of lateral extension from the sides of said frame wherein said bodies and frame form a continuous upwardly facing platform, said frame comprising a longitudinally extending body portion generally rectangular in cross section, said bodies comprising a pair of first bodies generally rectangular in transverse cross section and disposed on top of said body portion with the larger sides thereof in vertical juxtaposed relation when in folded together position and disposed at respectively opposite sides of said body portion with the larger sides substantially horizontal when in folded out position, and with the upper surfaces of said bodies and body portion forming said continuous upwardly facing platform, a second body generally rectangular in cross section and movably connected to each of said pair of first bodies, each said second body being movable from a folded in position of juxtaposition with the respective first body to a folded out position of extension from the end of the said first body which is remote from said body portion when the said first body is in folded out position, said second bodies when in folded in position being disposed above said body portion when said first bodies are in folded together position and extend to below said body portion when said first bodies are moved to folded out position, said second bodies when moved to folded out position when said first bodies are in folded out position having the upper sides thereof disposed in the plane of the upper sides of said body portion and first bodies, a longer and shorter side of each second body being adjacent and coextensive with a respective longer and shorter side respectively of the adjacent first body in the respective folded in and folded out positions of said second body.

4. A vehicle according to claim 3, which includes linkage means extending between said body portion and each of said pair of first bodies and between said first and second bodies and pivotally connected thereto for guiding said first pair of bodies between the folded together and folded out positions thereof on said body portions and for guiding said second bodies between folded in and folded out positions on said first bodies.

5. A vehicle according to claim 4, which includes a ramp member pivotally mounted on each second body and foldable outwardly therefrom to form a ramp at each side of the platform formed by said body portion and bodies when the bodies are in folded out position.

6. A vehicle according to claim 5, in which each said ramp member is subdivided longitudinally into a plurality of individual parts each of which is pivotally mounted on the respective second body.

7. A vehicle according to claim 4, in which the said linkage means connecting each first body to said body portion comprises a pair of spaced links.

8. A vehicle according to claim 7, in which the pivotal connections of the said pair of links with each first body are spaced vertically a predetermined distance in the direction of the shorter dimension of the said first body while the pivotal connections of the said links with said body portion are spaced apart a distance smaller than said predetermined distance.

9. A vehicle according to claim 7, which includes hydraulically operable cylinder piston means connected between said body portion and said first bodies for moving the latter between folded together and folded out positions on said body portion.

10. A vehicle according to claim 4, in which said linkage means extending between each first body and the respective second body comprises a triangular link having end and intermediate pivot points, pivot means joining said bodies at a corner thereof, said intermediate pivot point being connected to one of said bodies near said pivot means, and a hydraulically operable cylinder piston means connected between each said end pivot point of said triangular link and a respective one of said bodies.

11. A vehicle according to claim 10, in which said intermediate pivot point is connected to the said first body whereby when said first body is in folded together position, the said pivot means can be removed and the second body manipulated by means of the cylinder piston means connected to said triangular link.

12. A vehicle according to claim 11, in which said frame includes driving heads at the opposite ends thereof carrying said wheels, and power means in said heads.

13. A vehicle according to claim 12, in which at least one of said heads is pivotal on said frame on a vertical axis for steering purposes.

14. A vehicle according to claim 12, which includes a propeller carried by each head and driveable by the respective power means.

15. A vehicle according to claim 12, in which the said power means in one of said heads is coupled to the wheels carried by said one head, and means extending longitudinally of said frame for coupling the power means in said one of said heads to the wheels carried by the other of said heads.

* * * * *